United States Patent Office 2,988,591
Patented June 13, 1961

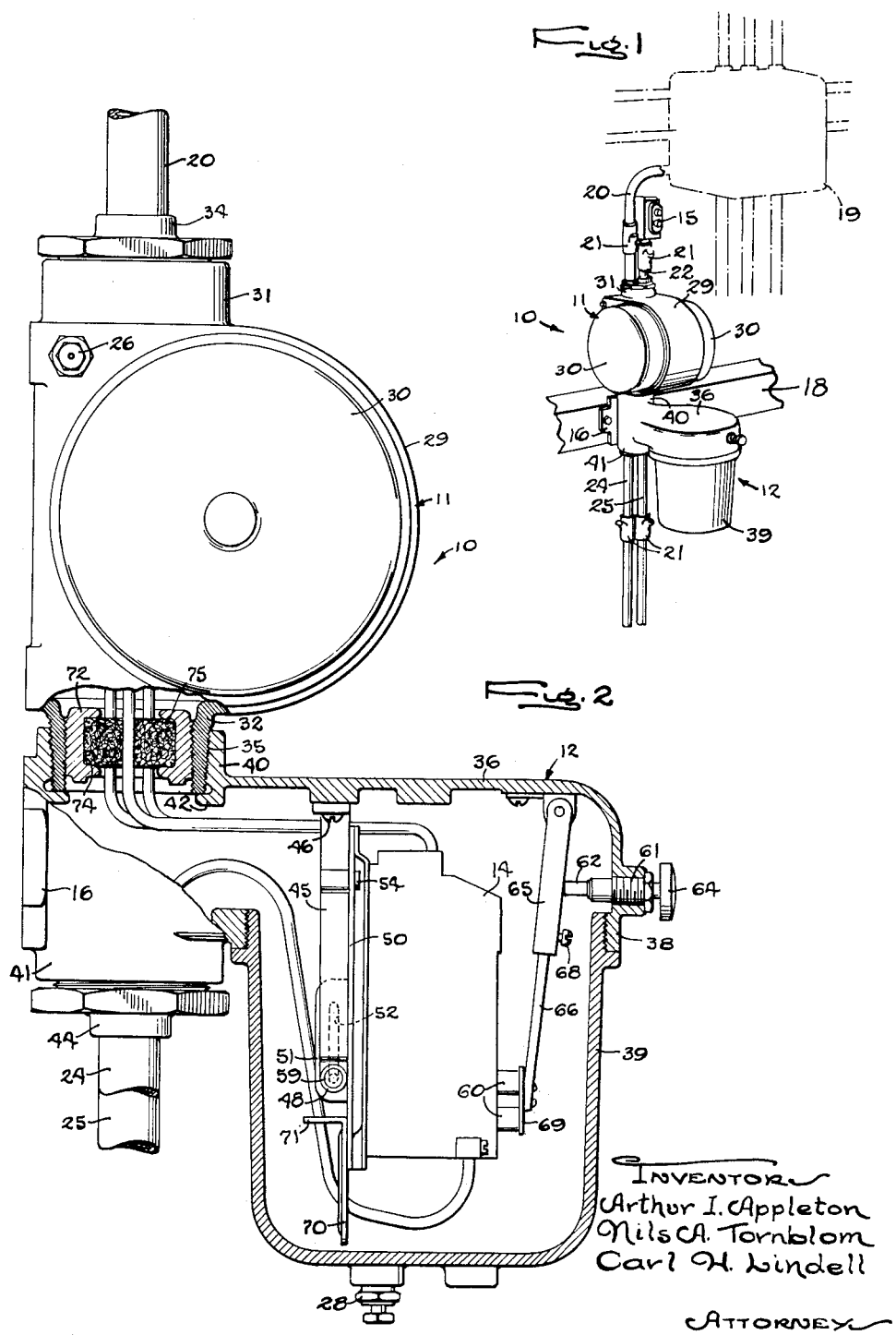

2,988,591
SECTIONAL SWITCHGEAR HOUSING
Arthur I. Appleton, Northbrook, and Nils A. Tornblom and Carl H. Lindell, Chicago, Ill., assignors to Appleton Electric Company, Chicago, Ill., a corporation of Illinois
Original application Jan. 24, 1952, Ser. No. 267,954. Divided and this application Nov. 29, 1957, Ser. No. 699,862
1 Claim. (Cl. 174—50)

The present invention relates generally to switchgear and, more specifically, to a novel switchgear housing which is particularly well adapted for explosion-proof, dustproof and raintight applications.

One object of the invention is to provide a switchgear housing for explosion-proof, dustproof and raintight applications and having a body made up of a plurality of sections attached together rather than being made as a single intricate casting.

Another object is to provide a switchgear housing of the character set forth and including means offering ready access to the encased switchgear for wiring, unwiring or otherwise servicing the same.

Other objects and advantages will become apparent as the following description proceeds, taken together with the accompanying drawing, in which:

FIGURE 1 is a perspective view showing an illustrative switchgear housing embodying the invention and installed as a part of the electrical system of a plant or building.

FIG. 2 is an enlarged fragmentary vertical sectional view through the illustrative housing shown in FIG. 1.

While the invention is susceptible of various modifications and alternative constructions, a certain preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claim.

Referring more specifically to the drawing, the invention is there shown exemplified in an illustrative switchgear housing 10 which happens to be of the explosion-proof type. The housing 10 in this instance comprises a first casing 11 and a second casing 12, each of generally cylindrical form. The casing 11, which for purposes of description will be referred to as the upper casing, houses a circuit breaker (not shown) which may be connected in the power supply circuit of an electric motor (not shown). The casing 12, which will be referred to descriptively herein as the lower casing, contains an electrical contactor 14 also in the motor circuit and which includes thermal overload protection. The contactor 14 may be actuated as by means of a push-button control station 15 located immediately adjacent the housing 10, as shown in FIG. 1, or situated alternatively in a more remote location. The housing 10 may be equipped with mounting ears 16 and attached to a suitable structural support 18 adapted to hold one or more such housings. Power from the electrical system of the plant or building in which the housing 10 is installed may be supplied from a junction box 19 via a conduit 20, the latter being mechanically isolated from the interior of the housing as by means of a sealing fitting 21. Additional sealing fittings 21 may be interposed in the other runs of conduit 22, 24 and 25 connected with the housing 10. The housing 10 may also be equipped with an explosion-proof vent fitting 26 and explosion-proof drain fitting 28 (FIG. 2).

To eliminate the need for intricate and expensive castings for making the housing 10 and thus reduce its manufacturing cost substantially, the housing 10 is built up of a plurality of casing units which may be assembled together in pairs or in multiple to fit the needs of a particular installation. Thus the upper casing 11 forms one such unit and comprises an open-ended cylindrical section 29 closed by a pair of convex end covers 30. Integral with the section 29 are a pair of hollow bosses 31, 32 alined along an axis disposed in perpendicular but non-intersecting relation with the main axis of the casing 11 running through the section 29 and covers 30. The boss 31, which for purposes of description will be referred to herein as the upper boss, is connected with the conduit 20 by means of a reducer or adapter 34. The boss 32, which may be descriptively referred to as the lower boss, carries external threads 35 and connects detachably with the lower casing 12.

Referring now to the lower casing 12 (FIG. 2), it will be perceived that the same comprises a generally cylindrical section 36 having a peripheral skirt 38 which threadedly receives a hollow pot-like cover 39. Integral with the section 36 is a pair of hollow bosses 40, 41 alined upon a common upright axis which is spaced and substantially parallel with the main axis of the lower casing 12. The boss 40 is internally threaded and receives the threaded boss 32 of the casing 11, the boss 32 bottoming against an internal stop 42. The boss 41 is internally threaded and in this instance houses a reducer or adapter fitting 44 which connects with the conduits 24, 25 leading from the housing 10. It might be noted that in the present illustrative construction, the mounting ears 16 of the housing 10 happen to be integral with the bosses 40, 41 of the lower casing 12.

As indicated earlier herein, the contactor 14 may have associated therewith a suitable device for protecting against thermal overloads the electric motor to which it may be connected. Such a device would of course open the motor circuit in the event of the thermal overload and would have to be reset as by means of one or two reset plungers 60. To actuate the button 60 from the exterior of the casing 12, the peripheral skirt of the latter carries a threaded sleeve 61. The latter, in turn, supports with a free but relatively close fit a sliding stem 62 terminating in a reset button 64 at its outer end. The stem and button 62, 64 are adapted to impart an inward angular displacement to a sleeve 65 pivoted to the underface of the top wall of the casing 12. The depending end of the sleeve 65 carries a reset arm 66 which is retained therein as by means of a set screw 68. The arm 66 terminates at its lower end in an arm 69 which engages the reset buttons 60.

By reason of the construction just described, if one should desire to gain access to the contactor 14 and its associated wiring, it is merely necessary to unscrew the cover 39 from the peripheral skirt 38 of the lower casing 12. The set screw 68 may then be loosened and the reset arm 66 detached from the sleeve 65 to get it out of the way. When this has been done, the contactor may be released for servicing, replacement, or other operation.

For most explosion-proof applications, it will be desirable to isolate the chambers 11 and 12 from each other internally. This may be accomplished conveniently by the use of a detachable sealing sleeve 72 adapted to engage threads on the inside of the outer boss 32 of the upper casing 11. The sleeve 72 may be formed with a sealing well 74 which can be filled with sealing compound 75 when the housing 10 is initially wired.

While the housing as illustrated in the drawings is eminently well qualified for service in explosion-proof and dustproof applications, it might be desirable to insert resilient gaskets between the covers 30, 39 and their respective casing sections to adapt the housing 10 for use in raintight applications.

This application is a division of our copending application, Serial No. 267,954, filed January 24, 1952.

We claim as our invention:

A sectional switchgear housing of the explosion-proof type comprising a first sealed casing having an open-ended section of generally cylindrical shape, end covers on said open-ended section encompassing substantially the entire cross-sectional area of said section, a pair of hollow threaded bosses integral with and opening into said open-ended section and having a common axis which is disposed in substantially perpendicular but non-intersecting relation with the axis of said open-ended section, a second sealed casing having a generally cylindrical main section located beneath and extending outwardly from said first casing and including a relatively shallow peripheral skirt depending therefrom, a relatively deep pot-like cover mounted in depending relation on said peripheral skirt, a pair of hollow threaded bosses integral with and opening into said main section and having a common axis, the axis of said second mentioned pair of bosses being disposed in substantially parallel but non-intersecting relation with the axis of said main section, one of said second pair of bosses opening upwardly and having an internal shoulder therein, said casings being secured together in sealed relation by engagement of one of said first pair of bosses within said upwardly opening boss of said second pair and with the end of said one boss seating against said internal shoulder, and means in said one of said first pair of bosses for sealingly isolating said casings.

References Cited in the file of this patent

UNITED STATES PATENTS

| | | |
|---|---|---|
| D. 157,593 | Hollaender | Mar. 7, 1950 |
| 202,368 | Newton | Apr. 16, 1878 |
| 378,878 | Eunson | Mar. 6, 1888 |
| 1,466,361 | Getchell | Aug. 28, 1923 |
| 2,050,854 | Olley | Aug. 11, 1936 |
| 2,158,477 | Olley | May 16, 1939 |
| 2,240,922 | Bissell | May 6, 1941 |
| 2,305,482 | Lester | Dec. 15, 1942 |
| 2,335,233 | Bush | Nov. 30, 1943 |
| 2,345,757 | Lester | Apr. 4, 1944 |
| 2,666,119 | Becker | Jan. 12, 1954 |